US012092313B1

(12) United States Patent
Tang

(10) Patent No.: US 12,092,313 B1
(45) **Date of Patent: *Sep. 17, 2024**

(54) LIGHTED MIRROR

(71) Applicant: ZHONGSHAN JINGXIAN PHOTOELECTRIC TECHNOLOGY CO., LTD., Zhongshan (CN)

(72) Inventor: Jingchuan Tang, Zhongshan (CN)

(73) Assignee: ZHONGSHAN JINGXIAN PHOTOELECTRIC TECHNOLOGY CO., LTD., Zhongshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,664

(22) Filed: Aug. 22, 2023

(30) Foreign Application Priority Data

Jul. 17, 2023 (CN) ......................... 202321883353.1

(51) Int. Cl.
*F21V 33/00* (2006.01)
*F21W 131/302* (2006.01)
*F21Y 115/20* (2016.01)

(52) U.S. Cl.
CPC ..... *F21V 33/004* (2013.01); *F21W 2131/302* (2013.01); *F21Y 2115/20* (2016.08)

(58) Field of Classification Search
CPC ........................ F21V 33/004; F21W 2131/302
See application file for complete search history.

(56) References Cited

U.S. PATENT DOCUMENTS 8,356,908 B1 * 1/2013 Zadro .................... F21V 33/004
362/135
9,765,958 B2 * 9/2017 Lumaye .............. F21V 33/0004
11,965,649 B1 * 4/2024 Tang ...................... F21V 33/004

FOREIGN PATENT DOCUMENTS

CN 111407067 A * 7/2020 ............. A45D 42/10

* cited by examiner

*Primary Examiner* — Julie A Bannan
(74) *Attorney, Agent, or Firm* — Daniel M. Cohn; Howard M. Cohn

(57) ABSTRACT

A lighted mirror includes a mirror body, a first light strip frame disposed on the mirror body, a second light strip frame disposed on the mirror body, a first LED light strip disposed on the first light strip frame, a second LED light strip disposed on the second light strip frame, and an annular light guide cover disposed on the first light strip frame. A light transmitting portion is disposed on the mirror body. The annular light guide cover is disposed in a light emitting direction of the first LED light strip. The first light strip frame defines a first middle hole and is disposed on an outer side of the light-transmitting portion. The second light strip frame defines a second middle hole and is disposed on an inner side of the light-transmitting portion. Light emitted by the second LED light strip penetrates through the light-transmitting portion.

10 Claims, 4 Drawing Sheets

LIGHTED MIRROR

TECHNICAL FIELD

The present disclosure relates to a technical field of lighted mirrors, and in particular to a lighted mirror light in weight and capable of emitting light from a front surface and a peripheral side thereof.

BACKGROUND

In daily life, people usually need to use mirrors to organize their appearance. In order to increase functions of the mirrors and facilitate use of the mirrors in a dark environment, a light strip acting as a light source is disposed inside a conventional mirror. Light emitted by the light strip is transmitted through a light guide plate disposed around a mirror body of the conventional mirror, so the conventional mirror has an illumination function. However, if an area of the conventional mirror is larger, an area of the light guide plate is large accordingly. As a result, the mirror is heavy, is strenuous to assemble, and is inconvenient to transport. Further, a display effect of the conventional is single, which cannot realize multi-angle illumination and is not artistic in appearance.

SUMMARY

A purpose of the present disclosure is to overcome defects in the prior art. The present disclosure provides a lighted mirror light in weight and capable of emitting light from a front surface and a peripheral side thereof, which realizes light emission of the front surface and the peripheral side of the lighted mirror, has a simple structure, has a light weight, and is artistic in appearance.

To achieve the above purpose, the present disclosure provides the lighted mirror light in weight and capable of emitting light from the front surface and the peripheral side thereof. The lighted mirror comprises a mirror body, a first light strip frame disposed on a rear portion of the mirror body, a second light strip frame disposed on the rear portion of the mirror body, a first LED light strip disposed on an outer side of the first light strip frame, a second LED light strip disposed on an outer side of the second light strip frame, and an annular light guide cover disposed on the first light strip frame. A light transmitting portion is disposed on a front surface of the mirror body. The annular light guide cover is disposed in a light emitting direction of the first LED light strip. The first light strip frame defines a first middle hole and is disposed on an outer side of the light-transmitting portion. The second light strip frame defines a second middle hole and is disposed on an inner side of the light-transmitting portion. Light emitted by the second LED light strip penetrates through the light-transmitting portion. The lighted mirror realizes the light emission of the front surface and the peripheral side of the lighted mirror, has the light weight, and is convenient to transport.

In one embodiment, a first loading portion is disposed on a front surface of the first light strip frame. The first loading portion is attached to the rear portion of the mirror body. An annular groove is defined on the outer side of the first light strip frame. The first LED light strip and the annular light guide cover are mounted in the annular groove. Therefore, the first LED light strip and the annular light guide cover are conveniently mounted.

In one embodiment, the first LED light strip and the second LED light strip emit lights of at least two colors.

In one embodiment, the lighted mirror further comprises a control module disposed on the rear portion of the mirror body. The control module is electrically and signally connected with the first LED light strip and the second LED light strip.

In one embodiment, the lighted mirror further comprises an anti-mist device disposed on the rear portion of the mirror body. The anti-mist device is electrically and signally connected with the control module. Therefore, the lighted mirror is applied to different environments.

In one embodiment, the lighted mirror further comprises a touch switch disposed on a front surface of the mirror body. The touch switch is electrically and signally connected with the control module, which is convenient for a user to adjust and control.

In one embodiment, the lighted mirror further comprises a driving power supply disposed on the rear portion of the mirror body. The driving power supply is electrically connected with the control module.

In one embodiment, the lighted mirror further comprises a rear plate. A second loading portion is disposed on one end, away from the mirror body, of the first light strip frame. The control module, the driving power supply, and the anti-mist device are disposed on the rear portion of the mirror body and are disposed in the second middle hole. The rear plate is detachably mounted on the second loading portion. The rear plate is configured to seal the first middle hole, which increases service life of the lighted mirror.

In one embodiment, the lighted mirror further comprises a first hanging rack horizontally disposed on the first light strip frame and/or a second hanging rack vertically disposed on the first light strip frame.

In one embodiment, the light-transmitting portion is a frosted structure or a fine-grained surface structure. Therefore, the light-transmitting portion is conveniently disposed on the front surface of the mirror body.

Compared with the prior art, in the present disclosure, the first light strip frame and the second light strip frame are mounted on the rear body of the mirror body, and the light-transmitting portion is disposed on the mirror body. The light-transmitting portion is disposed between the first light strip frame and the second light strip frame. The first LED light strip and the second LED light strip are respectively mounted in the first light strip frame and the second light strip frame. When working, the light emitted by the second LED light strip penetrates through the light-transmitting portion to realize light emission on the front surface of the mirror body, and the first LED light strip realizes light emission on the peripheral side of the mirror body. Therefore, light emission on the front surface and the peripheral side of the mirror body is realized without disposing a light guide plate. The lighted mirror has a simple structure, is convenient to mount, and is light in weight.

The light-transmitting portion is the frosted structure or the fine-grained surface structure. The light-transmitting portion is pattern structures arrayed around the mirror body. Each of the pattern structures is a rectangular structure, a circular structure, a triangular structure, a ring structure, or other polygonal structures. Alternatively, each of the pattern structures may be a LOGO pattern, etc., which improve brand value. Moreover, sawtooth structures are disposed on a light-emitting surface of the annular light guide cove, so the light emitted has different emitting angles, is soft, and is rich in appearance, which meets requirements of different scenarios.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

Figure 1:
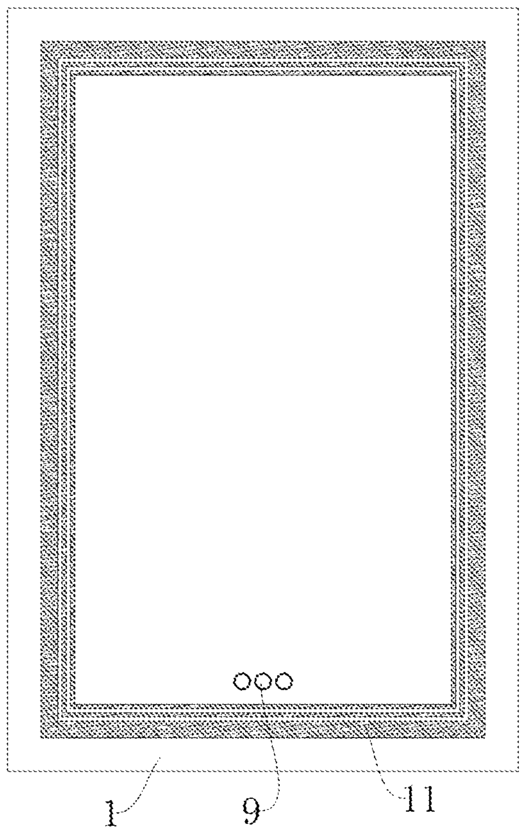
FIG. 1 is a front side elevational schematic diagram of a lighted mirror light in weight and capable of emitting light from a front surface and a peripheral side thereof of the present disclosure.
Figure 2:
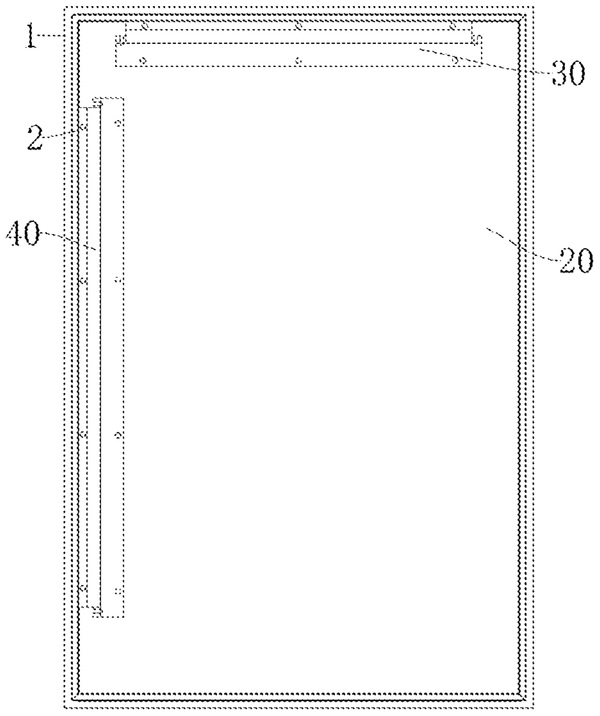
FIG. 2 is a rear side elevational schematic diagram of the lighted mirror of the present disclosure

Technical solutions in the embodiments of the present disclosure will be clearly and completely described below in conjunction with the accompanying drawings in the embodiments of the present disclosure. Obviously, the described embodiments are only a portion of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that all directional indications (such as up, down, left, right, front, back . . . ) in the embodiments of the present disclosure are only used to explain the relationship, relative positional relationship, movement conditions, etc., between the components in a specific posture (as shown in the drawings), if the specific posture changes, the directional indications change accordingly.

It should be noted in the description of the present disclosure that, unless otherwise regulated and defined, terms such as "installation," "bonded," and "connection" shall be understood in broad sense, and for example, may refer to fixed connection or detachable connection or integral connection, may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

It should be understood in the embodiments of the present disclosure that terms such as "first" and "second" are only used for the purpose of description, rather than being understood to indicate or imply relative importance or hint the number of indicated technical features. Thus, the feature limited by "first" and "second" can explicitly or impliedly include one or more features. In addition, the term "and/or" depict relationship between associated objects and there are three relationships thereon. For example, A and/or B may indicate A exists alone, A and B exist at the same time, and B exists alone. In addition, the technical solutions between the various embodiments may be combined with each other, but the combination should be realized by those skilled in the art. When the combination of the technical solutions is contradictory or cannot be implemented, it should be considered that the combination of the technical solutions does not exist or is not within the protection scope of the present disclosure.

As shown in FIGS. 1-8, the present disclosure provides a lighted mirror light in weight and capable of emitting light from a front surface and a peripheral side thereof. The lighted mirror comprises a mirror body 1, a first light strip frame 2, a first LED light strip 3, a second light strip frame 4, a second LED light strip 5, and an annular light guide cover 6.

A light transmitting portion 11 is disposed on a front surface of the mirror body 1. The first light strip frame 2 and the second LED light strip 5 are disposed on a rear portion of the mirror body 1. Optionally, a first loading portion 22 is disposed on a front surface of the first light strip frame 2, and the first loading portion 22 is attached to the rear portion of the mirror body 1, which is convenient for mounting the mirror body 1 and the first light strip frame 2. The first LED light strip 3 is disposed on an outer side of the first light strip frame 2. Optionally, an annular groove 23 is defined on the outer side of the first light strip frame 2. The first LED light strip 3 and the annular light guide cover 6 are mounted in the annular groove 23. Therefore, the first LED light strip 3 and the annular light guide cover 6 are fixedly mounted.

The second LED light strip 5 is disposed on an outer side of the second light strip frame 4. The annular light guide cover 6 is disposed on the first light strip frame 2 and is disposed in a light emitting direction of the first LED light strip 3. The first light strip frame 2 defines a first middle hole 21 and is disposed on an outer side of the light-transmitting portion 11. The second light strip frame 4 defines a second middle hole 41 and is disposed on an inner side of the light-transmitting portion 11. Light emitted by the second LED light strip 5 penetrates through the light-transmitting portion 11. In addition, both the first light strip frame 2 and the second light strip frame 4 are aluminum metal components, which have good heat dissipation capability and are light in weight.

Figure 6:
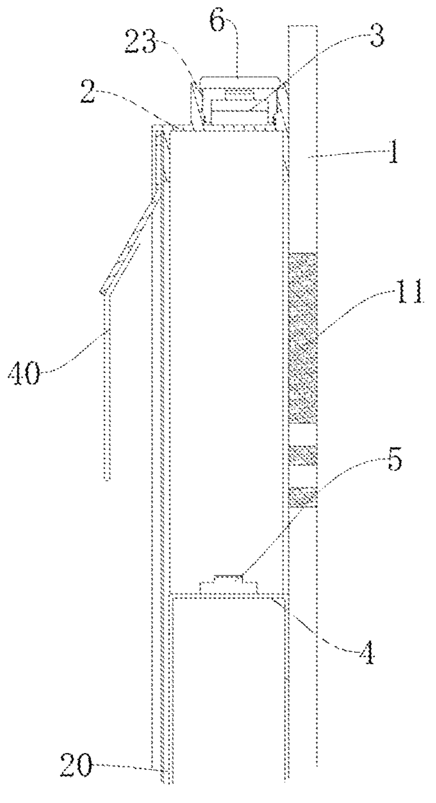
FIG. 6 is an enlarged schematic diagram of portion A shown in FIG. 5.
Figure 7:
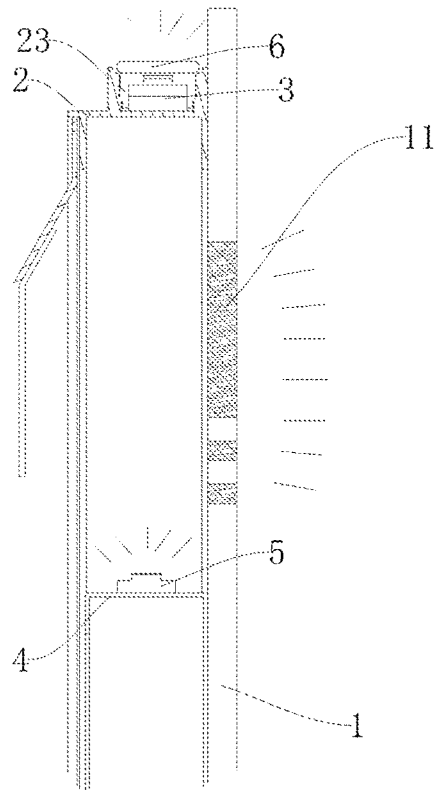
FIG. 7 is a schematic diagram of structure of FIG. 6 shown in a working state.

Specifically, the rear portion of the mirror body 1 is fixed on the first loading portion 22 disposed on the front surface of the first light strip frame 2 and seals the first middle hole 21. At this time, the first light strip frame 2 is disposed on the outer side of the light-transmitting portion 11, and then the second light strip frame 4 is attached to the rear portion of the mirror body 1, so the second light strip frame 4 is disposed in the light-transmitting portion 11. That is, the light-transmitting portion 11 is disposed between the first light strip frame 2 and the second light strip frame.4. As shown in FIGS. 6-7, when in use, the light emitted by the second LED light strip 5 is transmitted through the light-transmitting portion 11, so as to realize light emission on the front surface of the mirror body.

The light-transmitting portion 11 is the frosted structure or the fine-grained surface structure. The light-transmitting portion comprises pattern structures arrayed around the mirror body. Each of the pattern structures is a rectangular structure, a circular structure, a triangular structure, a ring structure, or other polygonal structures. As shown in FIG. 1, each of the pattern structures may be a ring structure with the mirror body 1 as a center and matched with a shape of the mirror body 1. The first LED light strip 3 is mounted on one side of the first light strip frame 2 to realize light emission on the peripheral side of the mirror body 1. The annular light guide cover 6 is optionally a polycarbonate (PC) light-transmitting cover. Moreover, sawtooth structures are disposed on a light-emitting surface of the annular light guide cove 6, so the light emitted has different emitting angles, is soft, and is rich in appearance, which meets requirements of different scenarios. Of course, in other embodiments, the annular light guide cover 6 may also be the fine-grained surface structure, etc., to improve light diffuse reflection and make the light soft. By processing the light-transmitting portion 11 of different structures or patterns on the front surface of the mirror body 1, by disposing the first light strip frame 2 and the second light strip frame 4 on the rear portion of the mirror body 1, and by disposing the second LED light strip 5 on the side of the second light strip frame 4, the light emission on both the front surface and the peripheral side of the mirror body 1 is realized, which improves atmosphere and aesthetics of the mirror when in use, and meets the requirements of different scenarios. Moreover, the lighted mirror does not need to mount a light guide plate, has a simple structure, is convenient to mount, and is light in weight.

The first LED light strip 3 and the second LED light strip 5 emit lights of at least two colors. Each of the first LED light strip 3 and the second LED light strip 5 is any one of a chip on board (COB) LED light strip, a red-green-blue correlated color temperature (RGBCCT) LED light strip, a red-green-blue-white (RGBW) LED light strip, an RGB LED light strip, and a CCT LED light strip.

Optionally, the lighted mirror further comprises a control module 7 disposed on the rear portion of the mirror body 1, an anti-mist device 8 disposed on the rear portion of the mirror body 1, and a touch switch 9 disposed on the front surface of the mirror body. The control module 7 is electrically and signally connected with the first LED light strip 3 and the second LED light strip 5. The anti-mist device 8 is electrically and signally connected with the control module 7. The touch switches 9 is electrically and signally connected with the control module 9. The control module 7 comprises a light control module 71 and an anti-mist control module 72. The light control module 71 is electrically and signally connected with the first LED light strip 3 and the second LED light strip 5. The light control module 71 controls colors and brightness of the light emitted by the first LED light strip 3 and the second LED light strip 5. The anti-mist control module 72 is electrically and signally connected with the anti-mist device 8. The anti-mist control module 72 controls a working state of the anti-mist device 8.

When in use, the touch switch is touched or pressed according to the needs, and the touch switch transmits signals to the control module 7. The control module 7 controls the colors and the brightness of the light emitted by the first LED light strip 3 and the second LED light strip 5 through the light control module 71. The control module 7 controls the anti-mist device 8 to work through the anti-mist control module 72, thereby removing mist on the front surface of the mirror body 1, which is convenient for users to use in different environments and places (e.g., in a bathroom). The anti-mist device 8 is an anti-mist sheet or an anti-mist film, which is not limited thereto. The anti-mist device 8 removes the mist on the front surface of the mirror body 1 by heating the rear portion of the mirror body 1.

Figure 3:
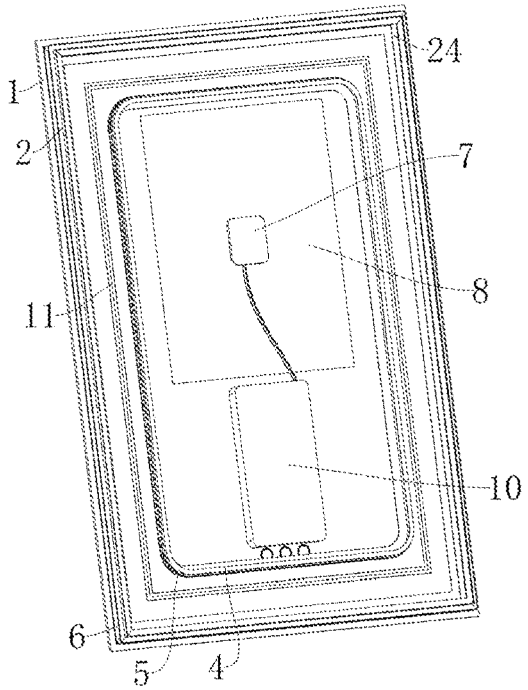
FIG. 3 is a structural schematic diagram of the lighted mirror of the present disclosure where a rear plate, a first hanging rack, and a second hanging rack are removed.
Figure 4:
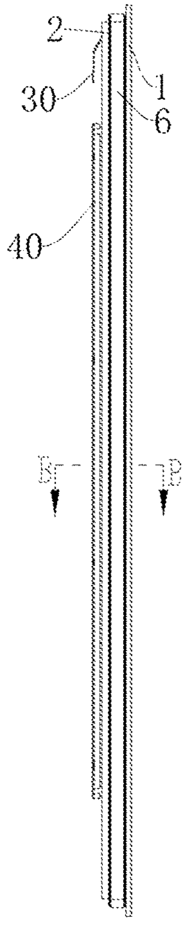
FIG. 4 is a side elevational schematic diagram of the lighted mirror of the present disclosure
Figure 5:
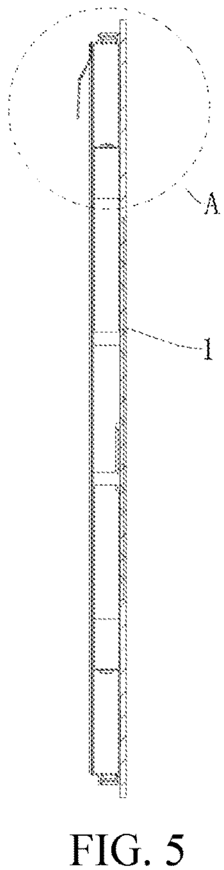
FIG. 5 is a cross-sectional schematic diagram of the lighted mirror taken along line B-B shown in FIG. 4.
Figure 8:
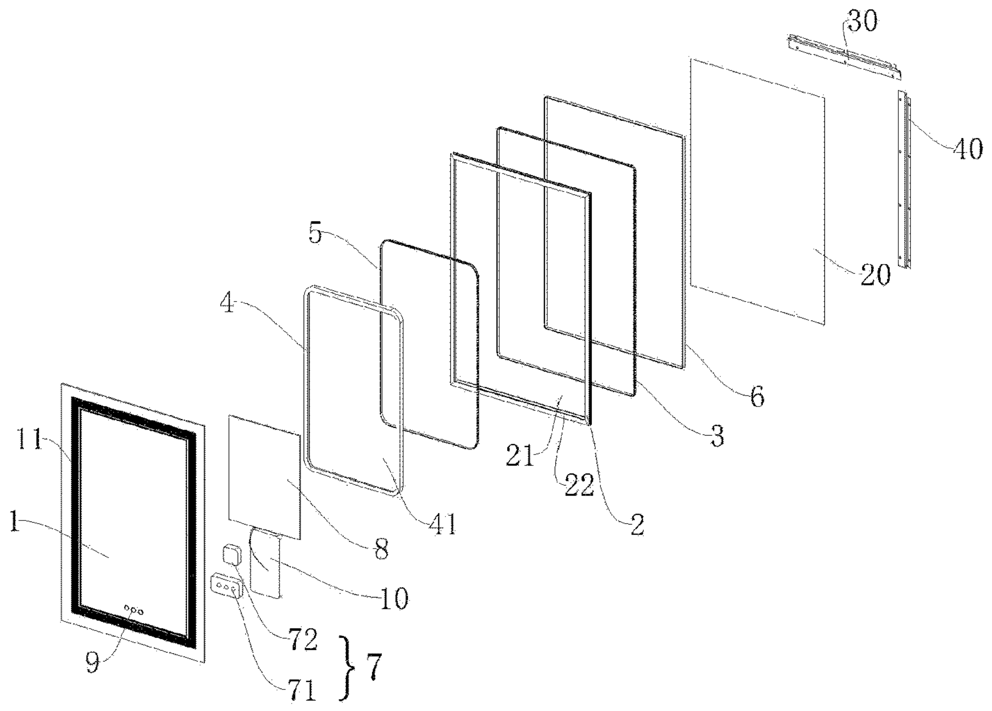
FIG. 8 is an exploded schematic diagram of the lighted mirror of the present disclosure In the drawings: 1—mirror body; 11—light—transmitting portion; 2—first light strip frame; 21—first middle hole; 22—first loading portion; 23—annular groove; 24—second loading portion; 3—first LED light strip; 4—second light strip frame; 41—second middle hole; 5—second LED light strip; 6—annular light guide cover; 7—control module; 71—light control module; 72—anti-mist control module; 8—anti-mist device; 9—touch switch; 10—driving power supply; 20—rear plate; 30—first hanging rack; 40—second hanging rack.

As shown in FIGS. 3 and 8, the lighted mirror further comprises a driving power supply 10 disposed on the rear portion of the mirror body 1. The driving power supply 10 supplies power to the first LED light strip 3 and the second LED light strip 5, the control module 7, the anti-mist device 8, and the touch switch 9, so that the lighted mirror is able to be used in a scene where power source is not convenient to connect. Of course, in other embodiments, the lighted mirror may further comprise a plug electrically connected with the control module 7. The plug is electrically connected with outside, so as to supply power to the first LED light strip 3 and the second LED light strip 5, the control module 7, the anti-mist device 8, and the touch switch 9.

Optionally, a voice recognition module is disposed in the control module.

When in use, the voice recognition module receives a voice command of the user and covert the voice command into a signal transmitted to the light control module 71 or the anti-mist control module 72 for operation. The lighted mirror further comprises an application (APP) control module. The APP control module is electrically and signally connected with the control module 7. The APP control module is mounted on an external mobile terminal, and the user is able to control the mirror through the APP control module, which improves diversity of functions of the lighted mirror.

Optionally, the lighted mirror further comprises a rear plate 20. A second loading portion 24 is disposed on one end, away from the mirror body 1, of the first light strip frame 2. Specifically, the control module 7, the anti-mist device 8, and the driving power supply 10 are disposed on the rear portion of the mirror body 1 and are disposed in the second middle hole 41. The rear plate 20 is fixed through screws, bolts, or clamping structures, so that the rear plates 20 is detachably mounted on the second loading portion 24. The rear plate 20 is configured to seal the first middle hole 21. In the present disclosure, the mirror body 1 seals the first middle hole 21 on the front surface of the first light strip frame 2, and the rear plate 20 seals the first middle hole 21 on the rear surface of the first light strip frame 2, so the control module 7, the anti-mist device 8, and the driving power supply 10 are protected from influence of the environment, thereby improving service life of the lighted mirror. When the lighted mirror needs to be maintained, the rear plate is detached to replace or repair the control module 7, the anti-mist device 8, and the driving power supply 10. Therefore, the lighted mirror is convenient to mount, detach, and maintain.

The lighted mirror further comprises a first hanging rack 30 horizontally disposed on the first light strip frame 2 and/or a second hanging rack 40 vertically disposed on the first light strip frame 2. Specifically, one of the first hanging rack 30 and the second hanging rack 40 may be disposed on the first light strip frame 2 or both of the first hanging rack 30 and the second hanging rack 40 are disposed on the first light strip frame 2, which is determined by a method that the lighted mirror is hung on a wall, so as to meet different usage situations.

The above embodiments are optional embodiments of the present disclosure, but the embodiments of the present disclosure are not limited by the foregoing embodiments, and any other changes, modifications, substitutions, combinations, and simplification made without departing from the spirit and principle of the present disclosure should be regarded as equivalent replacement manners, which are all included within the protection scope of the present disclosure.

What is claimed is:

1. A lighted mirror, comprising:

a mirror body, a first light strip frame disposed on a rear portion of the mirror body, a second light strip frame disposed on the rear portion of the mirror body, a first LED light strip disposed on an outer side of the first light strip frame, a second LED light strip disposed on an outer side of the second light strip frame, and an annular light guide cover disposed on the first light strip frame;

wherein a light transmitting portion is disposed on a front surface of the mirror body; the annular light guide cover is disposed in a light emitting direction of the first LED light strip; the first light strip frame defines a first middle hole and is disposed on an outer side of the light-transmitting portion; the second light strip frame defines a second middle hole and is disposed on an inner side of the light-transmitting portion; light emitted by the second LED light strip penetrates through the light-transmitting portion.

2. The lighted mirror according to claim 1, wherein a first loading portion is disposed on a front surface of the first light strip frame; the first loading portion is attached to the rear portion of the mirror body; an annular groove is defined on the outer side of the first light strip frame; the first LED light strip and the annular light guide cover are mounted in the annular groove.

3. The lighted mirror according to claim 1, wherein the first LED light strip and the second LED light strip emit lights of at least two colors.

4. The lighted mirror according to claim 3, wherein the lighted mirror further comprises a control module disposed on the rear portion of the mirror body; the control module is electrically and signally connected with the first LED light strip and the second LED light strip.

5. The lighted mirror according to claim 4, wherein the lighted mirror further comprises an anti-mist device disposed on the rear portion of the mirror body; the anti-mist device is electrically and signally connected with the control module.

6. The lighted mirror according to claim 5, wherein the lighted mirror further comprises a touch switch disposed on a front surface of the mirror body; the touch switch is electrically and signally connected with the control module.

7. The lighted mirror according to claim 6, wherein the lighted mirror further comprises a driving power supply disposed on the rear portion of the mirror body; the driving power supply is electrically connected with the control module.

8. The lighted mirror according to claim 7, wherein the lighted mirror further comprises a rear plate; a second loading portion is disposed on one end, away from the mirror body, of the first light strip frame; the control module, the driving power supply, and the anti-mist device are disposed on the rear portion of the mirror body and are disposed in the second middle hole; the rear plate is detachably mounted on the second loading portion; the rear plate is configured to seal the first middle hole.

9. The lighted mirror according to claim 1, wherein the lighted mirror further comprises a first hanging rack horizontally disposed on the first light strip frame and/or a second hanging rack vertically disposed on the first light strip frame.

10. The lighted mirror according to claim 1, wherein the light-transmitting portion is a frosted structure or a fine-grained surface structure.

* * * * *